United States Patent [19]
Day et al.

[11] Patent Number: 5,480,541
[45] Date of Patent: Jan. 2, 1996

[54] EXTRUDER APPARATUS FOR ISOLATING SOLIDS FROM FLUIDS

[75] Inventors: James Day, Scotia; Ganesh Kailasam; Godavarthi S. Varadarajan, both of Niskayuna, all of N.Y.

[73] Assignee: General Electric Company, Schenectady, N.Y.

[21] Appl. No.: 283,320

[22] Filed: Aug. 1, 1994

Related U.S. Application Data

[63] Continuation-in-part of Ser. No. 268,367, Jun. 30, 1994.

[51] Int. Cl.[6] .................................................. B30B 9/12
[52] U.S. Cl. ..................... 210/198.1; 210/294; 210/312; 210/313; 100/116; 100/117; 425/209; 425/376.1; 425/382.3
[58] Field of Search ............................... 210/198.1, 294, 210/295, 298, 312, 313, 319, 513, 523; 100/116, 117; 425/169, 170, 207, 209, 376.1, 381, 382.3

[56] References Cited

U.S. PATENT DOCUMENTS

| 3,450,034 | 6/1969 | Ocker | 100/117 |
|---|---|---|---|
| 3,877,365 | 4/1975 | Berggren | 100/117 |
| 4,003,304 | 1/1977 | Reinhall | 100/117 |
| 4,438,691 | 3/1984 | Solberg | 100/117 |
| 5,205,930 | 4/1993 | Obrestad | 100/117 |

OTHER PUBLICATIONS

Chemical Engineers' Handbook, Fifth Edition, McGraw-Hill Kogakusha, Ltd., pp. 75–85.

*Primary Examiner*—Robert A. Dawson
*Assistant Examiner*—David Reifsnyder
*Attorney, Agent, or Firm*—Edward A. Squillante, Jr.; William H. Pittman

[57] ABSTRACT

A novel apparatus for isolating solids, slurries or wetcakes from fluids is disclosed. Said novel apparatus comprises an extruder having a dynamic seal and a barrel comprising an auger and a movable cap which allows for solid recovery under pressure in the absence of substantial solvent volatilization.

12 Claims, 3 Drawing Sheets

EXTRUDER APPARATUS FOR ISOLATING SOLIDS FROM FLUIDS

This application is a continuation-in-part of U.S. Ser. No. 08/268,367, now allowed entitled "Apparatus for Separating Solids From Fluids", and is related to copending application U.S. Ser. No. 08/283,696, still pending, entitled "Extruder Apparatus For Separating Solids From Fluids".

FIELD OF THE INVENTION

This invention relates to a novel apparatus for isolating solids from fluids. More particularly, said apparatus comprises an extruder and a barrel with an auger and a movable cap which allows for solids, slurries or wet cakes to be isolated from liquids under pressure.

BACKGROUND OF THE INVENTION

For over a hundred years it has been well recognized that naturally occurring processes are inherently mixing processes and that the reverse procedure, unmixing or separation processes, typically creates challenging problems for engineers and the like. Nonetheless, many processes and apparatuses have been developed in order to transform a mixture of substances into two or more products which differ from each other in composition.

Conventional techniques which induce precipitation of solids from solutions in order to produce mixtures include crystallization, centrifugation, clarification and separation agent employment. Subsequent to mixture formation, the solids are separated from liquids by typical methods including evaporation, filtration, decanting and absorption. Such methods can be environmentally hazardous since they often require the vaporization and transporting of toxic solvents as well as the employment of expensive reagents. Moreover, known separation devices usually perform at atmospheric pressure or pressures lower than atmospheric and they often require temperature elevation before any solids may be separated from fluids.

The instant invention, therefore, relates to a novel apparatus for removing solids from fluids. More particularly, the apparatus comprises an extruder and a barrel comprising a movable cap and an auger which allows for solids and liquids to be isolated from one another (batch or continuously) under pressure without employing inefficient, energy intensive and environmentally unfavorable steps.

DESCRIPTION OF THE PRIOR ART

Apparatuses for isolating solids from solution have been disclosed in the art. In commonly assigned U.S. Pat. Nos. 4,603,194 and 4,634,761, volatilization vessels open to the atmosphere are disclosed. Said vessels comprise feed ports, outlet ports and impellers, wherein polymer solutions are fed into the vessel and heated in order to obtain polymer slurries which are subsequently centrifuged and dried in order to recover solid polymer.

Additionally, in commonly assigned U.S. Pat. No. 4,668,768, an evaporation vessel is described. Said evaporation vessel is charged with an organic solvent comprising polymer and an organic anti-solvent wherein a powdery polymer precipitate is recovered subsequent to vaporization.

In commonly assigned U.S. Pat. No. 5,306,807, efforts are disclosed for isolating polymers from solutions by subjecting the solutions to carbon dioxide, wherein the disclosure of said allowed application is incorporated herein by reference.

Still other investigators have focused on the recovery of solids from solution. In German Patent 0,184,935 polymer resins are isolated from solution by charging a holding tank with a polymer solution and adding carbon dioxide containing fluids.

Finally, in commonly assigned U.S. Pat. No. 5,043,421, a method for removing solvent from a polymer solution is described wherein the method utilizes at least one liquid non-solvent and an extruder subjected to atmospheric pressure and having liquid seals.

The instant invention is patentably distinguishable from the above-described since, among other reasons, it is directed to an extruder apparatus for separating solids from fluids wherein said extruder apparatus comprises an extruder and a barrel comprising a movable cap and an auger which allows for solids and liquids to be separated under pressure. Moreover, in the instant invention, fluids are defined as liquids, solutions comprising solids and/or gases dissolved therein, suspensions and emulsions. Further, fluids in the instant invention can mean mixtures of miscible or immiscible solvents.

SUMMARY OF THE INVENTION

Generally speaking, the instant invention relates to an extruder apparatus for isolating solids from fluids. The extruder apparatus comprises an extruder used to induce precipitation of solids from fluids and transport of the solids and fluids to a barrel comprising a movable cap and an auger used to separate said solids from fluids. Said extruder apparatus allows for solid and fluid isolation without the need for inefficient, energy intensive and environmentally unfavorable steps such as evaporation/volatilization of substantially all liquids (organic solvents) present in the system, the necessary employment of anti-solvents and the employment of expensive separation/precipitation agents. Further, the instant apparatus may function at a variety of temperatures; however, ambient temperature is often preferred.

The needs of the instant invention are met by the above-described novel extruder apparatus which comprises an extruder (closed to the atmosphere) and a barrel which is connected to said extruder. It is often preferred that the barrel is horizontal to said extruder. However, any arrangement which allows for solid particles in the extruder to enter the barrel will work; especially in the case where the solid particles are less dense than the fluid. The extruder typically comprises an extruder chamber, which may be one solid piece or connected chamber segments, a single screw or preferably twin screws inserted therein, wherein said single screw and twin screws have screw flights and said twin screws can be intermeshing or nonintermeshing, as well as co-rotating or counterrotating, a gear box (to rotate both screws when twin screws are employed), an extruder motor drive, a posterior extruder seal and optionally, removable chamber caps and a pressure gauge. Said posterior extruder seal is a dynamic seal able to withstand gas pressures often from about 50 to about 4000 psi and preferably from about 100 to about 2000 psi and most preferably from about 400 to about 800 psi created from gases. Further, the dynamic seal may be one which employs, for instance, compression fittings, graphite packings and magnetic couplings. The extruder further comprises solution/mixture and gas component inlets, and a preferred particle passage attached towards the back of said barrel (although the extruder can be directly attached to the barrel or attached to the barrel by any conventional communication means) and a filter attached to an outlet component. The gas supplied via the gas component inlet may be either pure gas or gas dissolved in solvent. Moreover, gas may also be predissolved in the solution so that a shorter extruder can be employed.

The barrel comprises a posterior portion, anterior portion and, internally, an auger (fixed in length) with a posterior shaft extending through the posterior portion of the barrel and attached to a barrel motor drive. Said auger comprises an anterior and posterior end and flights for moving solid particles towards the anterior portion of the barrel. The barrel motor drive is employed to rotate the auger inside the barrel. Often, the posterior end of the auger is conical and the posterior portion of the barrel comprises an annular seat inserted therein. The posterior annular seat acts as a rest for the posterior conical end of the auger. The posterior annular seat and the posterior conical end of the auger, together, act as a posterior dynamic seal for the barrel. However, it is within the scope of the instant invention to employ any conventional posterior sealing mechanism including those which employ o-rings, compression fittings, graphite packing and magnetic couplings.

The anterior portion of the barrel comprises threads, externally. Threaded on said threads of the anterior portion of the barrel is a movable cap. Internally, the anterior portion of the barrel has a groove with an o-ring inserted therein. The movable cap comprises an opening to the atmosphere and an inner section and often comprises, internally and surrounding said opening, an anterior annular seat attached to said inner section. Often, the anterior end of the auger is conical and rests on the anterior annular seat. Together, the anterior conical end of the auger and the anterior annular seat act as an anterior dynamic seal for the barrel. As is the case for the posterior portion of the barrel, it is within the scope of the instant invention to employ any conventional anterior sealing mechanism including those which employ o-rings, compression fittings and graphite packing.

It is particularly noted in the instant invention that movable cap means a cap having an inside diameter and internal threads complementary to the outside diameter and external threads on the anterior portion of the barrel such that the cap can be fully tightened or loosened (not as to fall off) on the anterior portion of the barrel. The movable cap is activated (tightened or loosened) by a cap motor drive which is regulated by a conventional torque sensor connected to the posterior shaft of the auger and the cap motor drive.

Additional features and advantages of the present invention will become apparent upon reading the following detailed description and the appended claims with reference to the accompanying figures.

BRIEF DESCRIPTION OF THE DRAWINGS

The subject matter which is regarded as the invention is particularly pointed out and distinctly claimed in the concluding portion of the specification. The invention, however, may be best understood by reference to the following description taken in conjunction with the accompanying drawing figures in which:

DETAILED DESCRIPTION OF THE PREFERRED EMBODIMENTS

Figure 1:
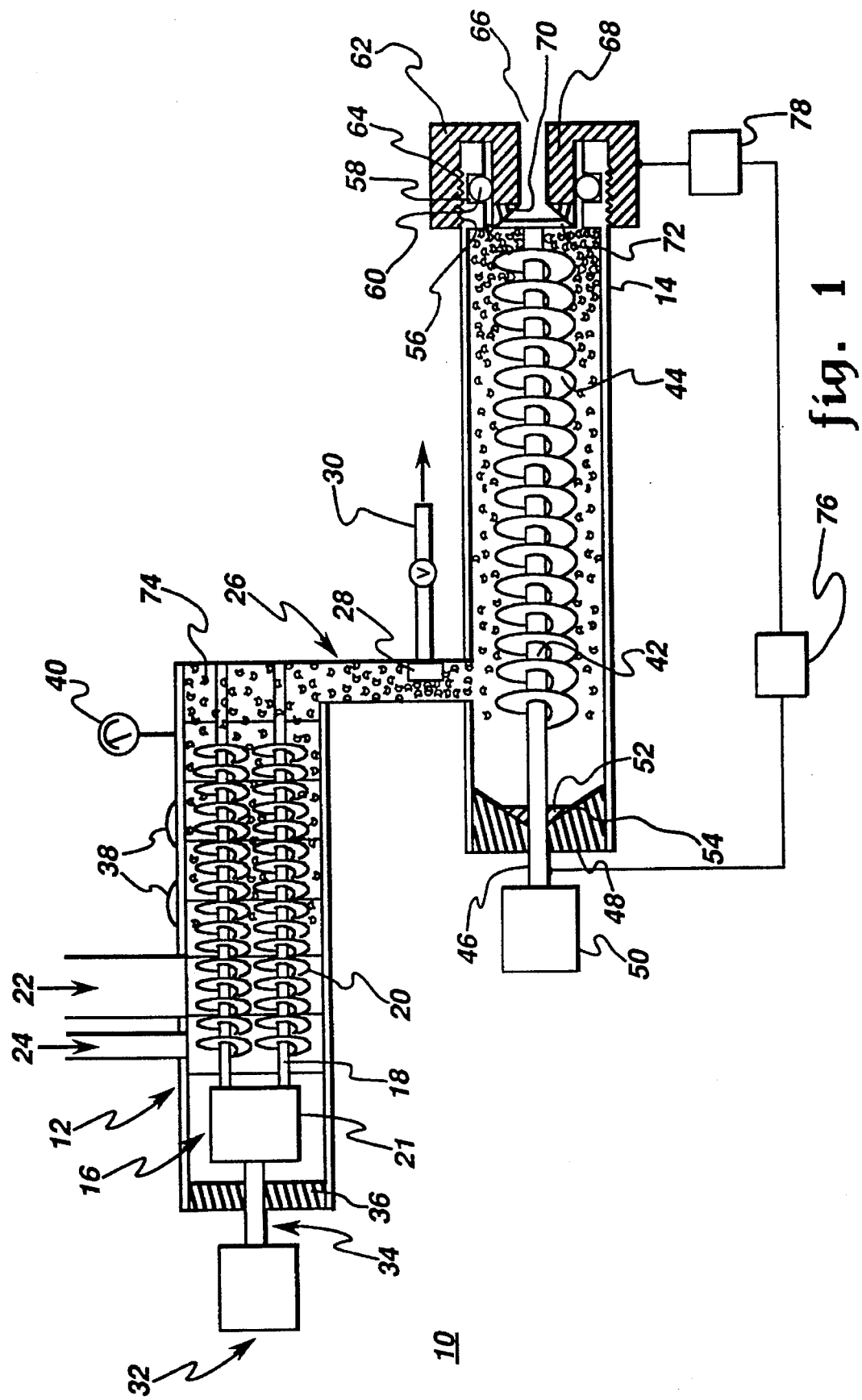
FIG. 1 is a schematic drawing of a side view of the apparatus of the present invention. It depicts solid particle precipitation in the extruder attached to the barrel having a tightened movable cap and the anterior conical end of the auger resting on the anterior annular seat which prevents particle removal at the anterior portion of the barrel.

Referring to the figures, an extruder apparatus 10 for separating solids from fluids is shown (FIG. 1). The apparatus 10 comprises an extruder 12 and a barrel 14 which is connected to said extruder 12. The extruder 12 comprises an extruder chamber 16 having an extruder screw 18 therein with screw flights 20 and a gear box 21 (when a twin screw is employed), a solution/mixture component inlet 22 and a gas component inlet 24. The extruder 12 also comprises a particle passage 26 attached to said barrel 14 and a filter 28 attached to a valve controlled outlet component 30. The extruder further comprises an extruder motor drive 32 to rotate said extruder screw 18. Said extruder motor drive has an anterior shaft 34 inserted through the posterior extruder seal 36 and connected to said extruder screw 18 via the gear box 21 and rotates said extruder screw 18. Additionally, said extruder 12 may, optionally, comprise movable caps 38 for additions to the extruder 12 and a pressure gauge 40.

The barrel 14 comprises, internally, an auger 42 having flights 44 and a posterior shaft 46 extending through the posterior portion of the barrel 48 and attached to a barrel motor drive 50. The barrel motor drive 50 is employed to rotate said auger 42 inside the barrel 14. The posterior end of the auger 52 is often conical and the posterior portion of the barrel 48 comprises an annular seat 54 inserted therein. The posterior annular seat 54 acts as a rest for the posterior conical end of the auger 52. The posterior annular seat 54 and the posterior conical end of the auger 52, together, act as a posterior dynamic seal for the barrel 14.

Figure 3:
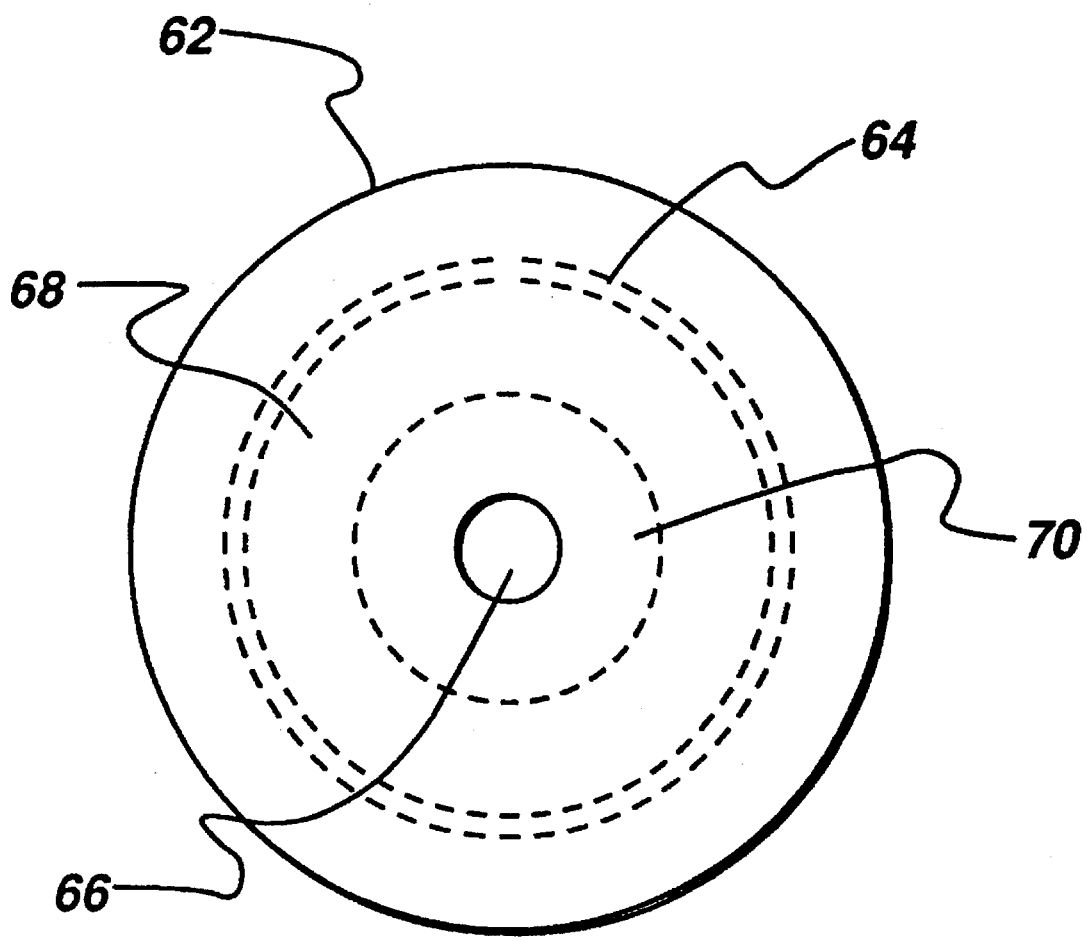
FIG. 3 is a schematic drawing of a cross-section of the movable cap of the present invention. It depicts the opening in the movable cap surrounded by the anterior annular seat.

The anterior portion of the barrel 14 comprises external threads 56. Internally, the anterior portion of the barrel 14 comprises a groove 58 with an o-ring 60 inserted therein. Threaded on said external threads 56 of the anterior portion of the barrel 14 is a movable cap 62 (FIG. 3) comprising internal threads 64 and an opening to the atmosphere 66, an inner section 68 and internally and surrounding said opening to the atmosphere 66, an anterior annular seat 70 attached to said inner section 68. The anterior end of the auger 72 is conical and rests on the anterior annular seat 70. Together, the anterior conical end of the auger 72 and the anterior annular seat 70 act as an anterior dynamic seal for the barrel.

The instant invention is not limited to any particular solids or fluids being isolated. If in fact a solution is introduced into the extruder 12 by way of the solution/mixture component inlet 22, the gas being supplied into said gas/liquid component inlet 24 generally induces precipitation of solid particle 74 from the solution. In this instance, the gas typically dissolves in the solution resulting in solid precipitation, and the extruder screw 18 with screw flights 20 thereon which is rotated by the extruder motor drive 32 via the anterior shaft 34 induces precipitation by enhancing gas dissolution and forces/carries said solid particles 74 towards the particle passage 26 and into the barrel 14. However, it is noted that if a mixture (solid and liquid) is supplied to the extruder 12 via the solution/mixture component 22, gas is not employed to induce precipitation in the mixture since solid to be isolated is present and the extruder 12 is therefore employed to convey solids and fluids to the barrel 14 via the particle passage. Moreover, if a mixture is supplied to the extruder 12 via the solution/mixture component 22, the gas component inlet 24 is not required.

In all instances, however, it is preferred to supply a gas or liquid component to the mixing vessel 12 via the gas/liquid component inlet 24 since it is preferable for the pressure inside the mixing vessel to be greater than external pressure.

While feeding the extruder 12 with solution/mixture and gas or liquid, solid particles 74 settle to the bottom of the extruder 12 and pass through the particle passage 26 into said barrel 14. The density of the solid particles relative to the density of the liquid causes the particles to enter the barrel 14. Liquid removal is accomplished by the passage of liquid or liquid and gas under pressure through the filter 28 and into the valve controlled outlet component 30.

In the instant invention, a torque is created as a direct result of the rotation of the auger 42 (and inherently its flights 44) and the packing of solid particles 74 towards the anterior portion of the barrel 14 near the movable cap 62.

It is noted that when the movable cap 62 is tightened, the anterior conical end of the auger 72 rests on the anterior annular seat 70 attached to the inner section 68 of said movable cap 62 forming the dynamic seal. When the dynamic seal is formed, no solid particles 74 or fluids escape from the barrel 14 via the opening to the atmosphere 66 in the movable cap 62. The torque is felt by said barrel motor drive 50 and said posterior shaft 46 and it continues to increase as more solid particles 74 pack near the anterior portion of the barrel 14.

Figure 2:
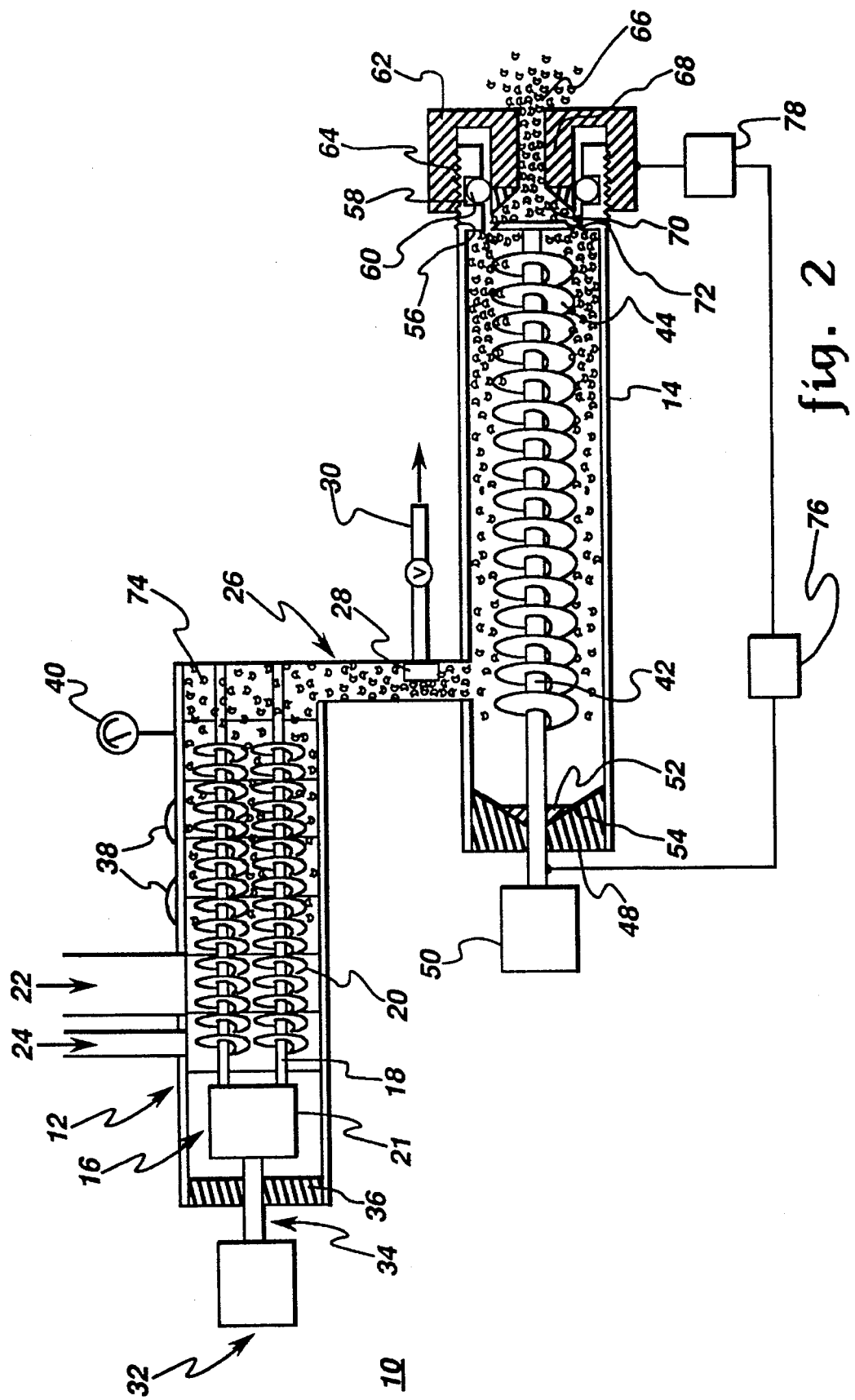
FIG. 2 is a schematic drawing of a side view of the apparatus of the present invention. It depicts solid particle precipitation in the extruder attached to the barrel having the movable cap loosened and the anterior conical end of the auger away from the anterior annular seat which allows particle removal at the anterior portion of the barrel.

When the torque felt by the barrel motor drive 50 and the posterior shaft 46 reaches a selected high, a conventional torque sensor 76 attached to said posterior shaft 46 senses the selected high torque and carries an electrical signal to a cap motor drive 78 which actuates (rotates) the movable cap 62 (causing it to loosen) resulting in a break in the dynamic seal. The dynamic seal is broken since the anterior conical end of the auger 72 is no longer resting on the anterior annular seat 70. This in turn causes solid particles 74 to escape the barrel 14 via the opening to the atmosphere 66 in the movable cap 62 (FIG. 2). Therefore, in the instant invention, loosening the movable cap 62 means that the movable cap 62 moves away from the anterior conical end of the auger 72 which prevents said anterior conical end of the auger 72 from resting on the anterior annular seat 70 resulting in solid particle 74 escape from the barrel 14. It is noted that there is no limitation with respect to the bulk density of the solid particles 74 recovered; however, said bulk density is often between about 10 to about 30 lbs/ft$^3$ when polycarbonates are recovered.

When said solid particles 74 escape the barrel 14 via the opening 66 in the movable cap 62, the torque felt by the barrel motor drive 50 and the posterior shaft 46 subsequently reaches a selected low and the conventional torque sensor 76 attached to said posterior shaft 46 senses the selected low torque and carries an electrical signal to said second motor drive 78 which again actuates the movable cap 62; however, in a direction towards the anterior conical end of the auger 72 (thus tightening the movable cap 62). This in turn causes said anterior conical end of the auger 72 to rest on the anterior annular seat 70 which reforms the dynamic seal preventing solid particles 74 from escaping the barrel 14; subsequently causing the process to begin again.

Moreover, the o-ring 60 inserted in the groove 58 prevents fluids from escaping the barrel 14 under the movable cap 62. Additionally, solid particles as used herein, are meant to include solid particles and/or wetcakes. Selected high torque is defined as the torque setting selected on the conventional torque sensor 76 which results in the cap motor drive 78 loosening the movable cap 62. Selected torque low is defined as the torque setting on the conventional torque sensor 76 which results in the cap motor drive 78 tightening the movable cap 62. The cap motor drive 78 employed in the instant invention may be any conventional drive unit used in the art that can tighten and loosen the movable cap 62. Often, said cap motor drive 78 is mechanical, hydraulic, pneumatic or preferably electromechanical in nature.

The following example is provided to further facilitate the understanding of the invention and it is not intended to limit the instant invention.

EXAMPLE

A bisphenol A polycarbonate (BPA) solution comprising 17% by weight polycarbonate and 83% by weight methylene chloride may be pumped into the solution inlet 22 of the extruder 12 at a rate of 80 lbs/hour. The extruder 12 may then be continuously charged with $CO_2$ at 650 psig until polycarbonate precipitates as solid particles. The solid particles enter the barrel 14 of the extruder apparatus 10 and the barrel motor drive 50 of the apparatus 10 is started so that the auger 42 rotates. Liquid is removed via an outlet 30. The solid particles 74 are carried towards the opening to the atmosphere 66 by flights 44 on the auger 42. They collect as a packed column near the opening to the atmosphere 66 of the barrel 14 creating a torque on the barrel motor drive 50 and the posterior shaft 46 of the auger 42. As a result, the conventional sensor 76 senses the torque and sends a electrical signal to a cap motor drive 78 which loosens the movable cap 62 releasing the anterior dynamic seal on the barrel 14. Solid particles 74 subsequently escape the opening to the atmosphere 66 and are recovered and dried.

What is claimed is:

1. An extruder apparatus for isolating solids, slurries or wetcakes from fluids, said apparatus comprising an extruder connected to a barrel and said extruder comprises:

(i) an extruder chamber having a screw with screw flights inserted therein, wherein said screw is attached to an extruder motor drive;

(ii) a posterior extruder seal;

(iii) solution or mixture component inlets; and said barrel comprises:

(iv) an internal auger with a posterior shaft, flights and anterior and posterior conical ends;

(v) anterior external threads;

(vi) a posterior annular seat; and (vii) a movable cap having an opening to the atmosphere wherein said movable cap comprises internal threads complementary to the anterior external threads of the barrel.

2. An extruder apparatus in accordance with claim 1 wherein said extruder has a particle passage connected to said barrel.

3. An extruder apparatus in accordance with claim 1 wherein said posterior extruder seal is a dynamic seal employing a compression fitting, graphite packing or a magnetic coupling.

4. An extruder apparatus in accordance with claim 3 wherein said extruder is able to withstand gas pressures from about 50 to about 400 psi.

5. An extruder apparatus in accordance with claim 1 wherein said movable cap further comprises an inner section having an anterior annular seat attached thereto.

6. An extruder apparatus in accordance with claim 1 wherein said extruder has a gas inlet component.

7. An extruder apparatus in accordance with claim 1 wherein said posterior shaft is attached to a barrel motor drive which rotates said auger.

8. An extruder apparatus in accordance with claim 1 wherein said extruder has a filter therein and attached to an outlet component.

9. An extruder apparatus in accordance with claim 1 wherein said apparatus is pressurized and closed to the atmosphere.

10. An extruder apparatus in accordance with claim 1 wherein said apparatus comprises a torque sensor attached to said posterior shaft.

11. An extruder apparatus in accordance with claim 1 wherein said extruder apparatus comprises a cap motor drive in connection with and for rotating said movable cap.

12. An extruder apparatus in accordance with claim 11 wherein said cap motor drive is mechanical, hydraulic, pneumatic or electrochemical in nature.

* * * * *